US005151262A

United States Patent [19]

Pemsler et al.

[11] Patent Number: 5,151,262

[45] Date of Patent: Sep. 29, 1992

[54] PYRITE CATHODE MATERIAL FOR A THERMAL BATTERY

[75] Inventors: J. Paul Pemsler, Lexington; John K. Litchfield, Bedford, both of Mass.

[73] Assignee: The United States of America as represented by the Secretary of the Navy, Washington, D.C.

[21] Appl. No.: 652,156

[22] Filed: Feb. 7, 1991

[51] Int. Cl.[5] ...................... H01M 43/00; C01B 17/00

[52] U.S. Cl. ................................ 423/561.1; 423/565; 429/218

[58] Field of Search ..................... 423/561.1, 565, 560, 423/562; 429/218

[56] References Cited

U.S. PATENT DOCUMENTS

| | | | |
|---|---|---|---|
| 3,898,096 | 8/1975 | Heredy et al. | 429/218 |
| 3,907,589 | 9/1975 | Gay et al. | 429/221 |
| 4,119,769 | 10/1978 | Schneider et al. | 429/112 |
| 4,649,227 | 3/1987 | Tributsch | 423/659 |
| 4,675,256 | 6/1987 | Winchester et al. | 429/112 |
| 4,676,970 | 6/1987 | Todd et al. | 423/565 |

FOREIGN PATENT DOCUMENTS

| | | | |
|---|---|---|---|
| 50-7795 | 1/1975 | Japan | 423/265 |

OTHER PUBLICATIONS

Morimoto et al., Pyrrhotites: Stoichiometric compositions with composition Fen-1 Sn (N≧8) Science, vol. 168, pp. 394–396, May 1970.

*Primary Examiner*—Gary P. Straub
*Attorney, Agent, or Firm*—Kenneth E. Walden

[57] ABSTRACT

High purity synthetic pyrite is produced in a two-step and also in a one-step sulfidation reaction of iron powder. In a two-step process, a hydrogen-annealed iron powder is first reacted with molten sulfur at a temperature of from about 200°–455° C., while subjecting the reaction mass to mixing for a period sufficient to convert the iron powder to pyrrhotite, which is then reacted in a second step with sulfur vapor at a temperature of from about 420°–550° C., while subjecting the reaction mass to mixing for a period sufficient to convert the pyrrhotite to substantially pure pyrite. In a one-step process, iron powder is gradually heated from room temperature to about 550° C. in the presence of sulfur while continuously mixing to prevent sintering and agglomeration.

13 Claims, No Drawings

PYRITE CATHODE MATERIAL FOR A THERMAL BATTERY

BACKGROUND OF THE INVENTION

1. Field of the Invention

The present invention relates in general to a synthetic cathode material for a molten salt battery and, more particularly, to a process of providing and using synthetic pyrite for use as a cathode in a thermal battery.

2. Description of Related Art

It is known to use a thermal battery containing a molten salt, a lithium or lithium alloy anode, and an iron disulfide (pyrite) cathode in applications requiring a high power output. These batteries, which have been successfully used in a number of military applications, include iron disulfide cathode material obtained as benefacted or from natural occurring pyrite deposits, or as a byproduct of flotation concentrate from the processing of base or noble metal ores.

It is highly unusual to find a natural occurring substance used directly as a principal ingredient in a chemical system requiring components with extremely uniform properties. In this case, the availability and quality of pyrite have caused persistent problems for thermal battery manufacturers. In recent times, it has been very difficult to obtain this material from domestic sources. Additionally, the quality of the pyrite has varied dramatically among sources and even between lots from the same source. It is axiomatic that the reproducibility of the cathode behavior would be improved by using pyrite of highly uniform physical and chemical properties.

It is known that the initial sulfidation of iron to pyrrhotite (FeS) is a very rapid and highly exothermic reaction. It is also known that the heat of this reaction may cause localized overheating causing deleterious sintering and even melting of residual iron. This is known to prevent sulfur from reacting further with the remaining iron powder. In addition, the localized overheating can raise the temperature above the decomposition temperature of pyrite, thus preventing its formation. In addition, sulfidation of iron in packed beds below sintering conditions using reduced sulfur vapor pressures has been found to be so slow as to make this method of little practical use.

It is, therefore, desirable to have a process for the production of pure synthetic pyrite with uniform physical and chemical properties which will provide a new raw material with minimum variations in processing and performance capability, thereby ensuring high quality thermal batteries.

It is also desirable to have available a synthetic pyrite which will provide a domestic source of feed that is not subject to periodic interruption by national events such as strikes and mine closings.

It is also desirable to have an improved cathode which will provide improved voltage regulation in thermal batteries made with synthetic pyrite cathode.

Further, it is desirable to provide a practical sulfidation process for producing pyrite which can be conducted below the sintering temperature and decomposition temperature of pyrite.

SUMMARY OF THE INVENTION

An improved two-step process is provided for the production of high purity synthetic pyrite by sulfidation of iron powder at elevated temperatures by (a) reacting in an inert atmosphere molten sulfur with hydrogen annealed iron powder at a temperature of from about 200–445° C., while subjecting the reaction mass to mixing for a period sufficient to convert substantially all of the iron powder to pyrrhotite and, optionally, cooling and grinding, and (b) reacting in an inert atmosphere the resultant pyrrhotite with sulfur vapor at a temperature of from about 420–550° C., while subjecting the reaction mass to mixing for a period sufficient to convert the pyrrhotite to substantially pure pyrite. The process can also be carried out in one step, in which the temperature is raised from room temperature to about 550° C. at a sufficiently slow rate (about 2–3 hours) to reach 445° C. and about another hour to reach 550° C. The use of this synthetic pyrite as a cathode in a thermal battery results in a high energy output.

DESCRIPTION OF THE PREFERRED EMBODIMENT

It has surprisingly been discovered that substantially pure pyrite can be produced in a two-step sulfidation of iron powder at elevated temperatures by first reacting in an inert atmosphere molten sulfur with iron powder, which has optionally been hydrogen annealed, at a temperature of from about 200–445° C., while subjecting the reaction mass to mixing in the presence of alumina or other hard ceramic spheres or pellets or the like for a period sufficient to convert substantially all of the iron powder to pyrrhotite, and optionally cooling and grinding same. This material is then reacted with sulfur vapor at a temperature of from about 420–550° C., while subjecting the reaction mass to mixing for a period sufficient to convert the pyrrhotite to substantially pure pyrite.

In order to ensure a very low oxygen content of the final pyrite product, it may be desirable to deoxidize the surface of the iron powder prior to sulfidation. This is preferably accomplished by hydrogen annealing the iron powder at a temperature below the sintering temperature of the powder. This can be accomplished by passing hydrogen reducing gas over the iron powder heated to about 500° C. for a period of several hours. In a preferred embodiment, the iron powder is heated to a temperature of from about 300–400° C. for from about 1–3 hours and then stored in a dry box until ready for use in the sulfidation process.

In a preferred embodiment, the first step of the process of the present invention comprises reacting in an inert atmosphere molten sulfur with the hydrogen annealed iron powder at a temperature of from about 325–445° C., while subjecting the reaction mass to mixing, preferably in a rotary kiln. This ensures adequate mixing of reactants and prevents agglomeration of the partially reacted iron powder. Since the initial reaction of the iron powder to pyrrhotite is very rapid and the reaction is highly exothermic, heat must be dissipated from the iron powder during this reaction or localized over heating will cause sintering, melting of the residual iron, and possibly decomposition of any pyrite formed. The resultant pyrrhotite can optionally be cooled and ground to about −100 mesh. In the second step, the pyrrhotite is then reacted with sulfur vapor at a reaction temperature of from about 475–525° C., while mixing the reaction mass.

Alternatively, the process of the present invention can, in another embodiment, be carried out in one step by gradually raising the temperature from room temperature to approximately 550° C. without an actual temperature hold at 445° C. In the one-step process, the mixture must be thoroughly mixed during the reaction.

The hydrogen annealed iron powder preferably has a particle size of from about 0.037–0.147 mm, more preferably from about 0.037–0.074 mm, and most preferably from about 0.037–0.053 mm. It is preferred to maintain the iron powder in a dry box after being deoxidized in a hydrogen atmosphere. It is also preferred that the reaction be carried in an inert atmosphere, and preferably the reactor is flushed with argon and/or nitrogen prior to the reactor being sealed.

In the two-step process, during the initial reaction, where $FeS_{1.14}$ is formed, it is preferred to use an excess of sulfur of about 100%. In the second step, an excess of sulfur of about 8% is preferably used to form $FeS_2$. In a continuous one-step process, it is preferred to use about an 8% excess of sulfur over that required to form pyrite.

In a preferred embodiment, the process of the present invention can be carried out in a rotary kiln, preferably made of an inert material such as alumina, which can be sealed during the reaction. It is also preferred to mix and effect a small amount of grinding of the reaction mass so as to constantly expose fresh surfaces to the sulfur. This can be accomplished in a number of ways. Preferably, rods, balls, or pellets of alumina or other inert ceramic material can be placed in a rotary kiln to stir, mix, and grind the reaction mixture as the kiln rotates. The rods, balls, or pellets should be sufficiently large to effect thorough mixing of the iron powder and sulfur. Mixing with the rods, balls, or pellets does not necessarily result in significant particle size reduction but can expose fresh surfaces of the particles. This mixing and grinding action also prevents sintering during the sulfidation and formation of the pyrrhotite.

In the two-step process, after charging the iron and sulfur into the reactor and sealing same, the temperature is allowed to rise slowly to about 445° C. over a period of from about 1–3 hours and held at that temperature for a period of from about 0–2 hours, and then optionally cooled to room temperature and ground to about −100 mesh. Preferably, the reaction is conducted in the second step by raising the temperature to about 475–525° C. in a rotary kiln without any sintering of the material. This reaction is preferably carried out at a sulfur pressure of from about 0.003–4, more preferably from about 1–3 atm. The sulfur pressure in the reactor is determined by the reactor temperature. At temperatures below 445° C., the pressure will be less than I atm and above 445° C., the pressure will be above 1 atm.

In a one-step process, the reaction can be carried out continuously, without any intermittent cooling, by gradually increasing the temperature of the reaction chamber from room temperature to about 550° C.

It is preferred to conduct the reaction in an inert ceramic reaction chamber in the absence of oxygen and moisture. This can be accomplished by flushing the reaction chamber with an inert gas after charging the reactants. Preferably, the reaction chamber is sealed to prevent the escape of the sulfur gases. The process of the present invention can be carried out as one continuous process, or it can be interrupted after the formation of pyrrhotite to subject the pyrrhotite powder to grinding before it is then sulfidized to form pyrite. Optionally, one or more interruptions involving cooling and grinding of the pyrrhotite can be carried out. Preferably, the use of the alumina rods or balls in a rotary kiln can advantageously be used to minimize or, in some cases, eliminate the need for intermediate cooling and grinding of the pyrrhotite powder during this process.

In the two-step process, following the sulfidation of the hydrogen-annealed iron powder to form pyrrhotite, the latter is sulfidized, preferably in a rotary kiln in the presence of sulfur vapors at a temperature of from about 420–550° C. Preferably, the sulfur pressure in this latter stage is from about 0.7–3.8 atm, and the process is preferably carried out in the absence of oxygen and moisture for a period sufficient to form pyrite.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth in degrees Celsius; and, unless otherwise indicated, all parts and percentages are by weight.

EXAMPLES

Example 1

An alumina reaction tube 2½" in diameter and 12" long was charged with approximately 100 g of hydrogen-annealed iron powder (−325 mesh) and 125 g of sulfur powder. Also added to the reaction tube are five alumina rods approximately 1 cm in diameter×15 cm long. The charge was sealed into the alumina tube with a ceramic top having an aluminum silicate machined plug. The reactor tube was then loaded into a stainless steel rotatable reactor vessel which can be heated. After the reactor was sealed, the reactor vessel was flushed with argon, and the vessel was left under a slow argon purge overnight.

The reactor was rotated at a speed of approximately 20 revolutions/minute, and the reaction temperature was allowed to slowly climb to 420° C over a period of 4 hours. The furnace temperature was held for a period of about 4 hours at 420° C and then cooled to room temperature overnight under flowing argon. After cooling, the alumina reaction tube was removed from the steel tube and placed into a dry box. The tube was discharged, and the product was ground and sieved. The product was analyzed by TGA and found to have a composition of $FeS_{1.86}$. The material was then loaded into the reactor and transferred to a furnace, where approximately 25 g of sulfur were added, and the temperature was raised to 420° C. This temperature was maintained for a period of 4 hours. The powder was removed from the tube, screened, and a TGA analysis indicated a composition of $FeS_{1.98}$.

EXAMPLE 2

The same experimental set-up was used as in Example 1. 100 grams of hydrogen annealed iron powder is placed in the sulfidation reactor with 126 g of sulfur. The reactor is heated to 550° C and the temperature maintained for a period of 3 hours while the reactor is rotated at a speed of 18 rpm. The product powder is substantially pure pyrite.

EXAMPLE 3

The same experimental procedure was used as in Example 1. 99 g of hydrogen annealed iron powder and 125 g of sulfur were placed into the reactor tube with alumina rods. The reactor was evacuated and backfilled with argon. The reactor was heated to 450° C. over a 4-hour period. The reactor was held at temperature for 3 hours, 15 minutes, and then cooled to room temperature. The product was removed from the reactor, ground lightly, and screened to −100 mesh (less than 147 microns). 178 g of the product was returned to the sulfidation reactor with 25 g of sulfur and the reactor heated to 420° C. over a 3-hour period and maintained at this temperature for an addition 5 hours. Analysis of the final product indicated a composition of $FeS_{1.98}$.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of high purity synthetic pyrite by the sulfidation of iron powder at elevated temperatures, the improvement comprising the steps of:

(a) in an atmosphere of sulfur vapor and an insert gas of argon or nitrogen, reacting sulfur with iron powder at a temperature of from about 235–445° C., while mixing the reaction mass for a period of time sufficient to convert the iron powder to pyrrhotite, and (b) in an atmosphere of sulfur vapor and an insert gas of argon or nitrogen reacting the resultant pyrrhotite with sulfur vapor at a temperature of from about 475–525° C., while mixing the reaction mass for a period sufficient to convert the pyrrhotite to about 99% pure pyrite.

2. The process of claim 1, wherein the iron powder has a particle size of from about 0.39–0.174 mm and has been hydrogen annealed.

3. The process of claim 1, wherein in the initial reaction in step (a) where pyrrhotite is formed, about 100% excess sulfur is used over that required to form $FeS_2$.

4. The process of claim 3, wherein prior to step b, the sulfur content is adjusted so that in step (b) about 8% excess sulfur is used over that required to form $FeS_2$ from the pyrrohotite.

5. The process of claim 4, wherein the iron powder has a particle size of from about 0.037–0.074 mm and has been hydrogen annealed.

6. The process of claim 1, wherein the reaction in steps (a) and (b) is conducted in a rotary kiln containing inert ceramic rods, balls, or pellets which mix the reaction mass as the kiln rotates, thereby preventing sintering during sulfidation.

7. The process of claim 1, further comprising the steps of cooling and grinding the reaction mass from step (a) to a mesh size of from about −325 to 80 before conducting step (b).

8. The process of claim 7, wherein in step (b) the reaction mass is subjected to intermittent cooling and grinding steps until substantially pure pyrite is obtained.

9. The process of claim 1, wherein the reaction is conducted in a rotary alumina kiln.

10. The process of claim 1, wherein the reaction is conducted in the absence of oxygen and moisture.

11. The process of claim 1, wherein the iron powder is annealed in a hydrogen atmosphere at a temperature of from about 300–400° C. to deoxidize the surface of the iron prior to sulfidation.

12. The process of claim 1, wherein the sulfidation of pyrrhotite to pyrite in step (b) is conducted at a temperature of from about 475–525° C.

13. The process of claim 1, wherein the reaction is conducted in step (a) at a sulfur pressure of from about 0.003–1 atm and, in step (b), at a sulfur pressure of about 0.7–4 atm.

* * * * *